(12) United States Patent
Brady et al.

(10) Patent No.: US 12,492,495 B2
(45) Date of Patent: Dec. 9, 2025

(54) BRAIDED TUBULAR TEXTILE SLEEVE WITH HYBRID YARNS AND METHOD OF CONSTRUCTION THEREOF

(71) Applicant: Systems Protection Group US LLC, Northville, MI (US)

(72) Inventors: Alexa Brady, Ardmore, PA (US); Cassie Marie Malloy, Trappe, PA (US)

(73) Assignee: Systems Protection Group US LLC, Northville, MI (US)

( * ) Notice: Subject to any disclaimer, the term of this patent is extended or adjusted under 35 U.S.C. 154(b) by 0 days.

(21) Appl. No.: 18/757,030

(22) Filed: Jun. 27, 2024

(65) Prior Publication Data
US 2025/0003124 A1    Jan. 2, 2025

Related U.S. Application Data

(60) Provisional application No. 63/524,514, filed on Jun. 30, 2023.

(51) Int. Cl.
| | | |
|---|---|---|
| *D04C 1/02* | (2006.01) | |
| *D02G 3/02* | (2006.01) | |
| *D02G 3/26* | (2006.01) | |
| *D02G 3/38* | (2006.01) | |
| *D04C 1/06* | (2006.01) | |

(52) U.S. Cl.
CPC ............. *D04C 1/02* (2013.01); *D02G 3/02* (2013.01); *D02G 3/26* (2013.01); *D02G 3/38* (2013.01); *D04C 1/06* (2013.01); *D10B 2331/04* (2013.01); *D10B 2505/00* (2013.01)

(58) Field of Classification Search
CPC ............... D04C 1/02; D04C 1/06; D02G 3/38
See application file for complete search history.

(56) References Cited

U.S. PATENT DOCUMENTS

| | | | |
|---|---|---|---|
| 4,947,727 A * | 8/1990 | Momoi .................... | D07B 1/02 |
| | | | 57/236 |
| 5,866,216 A | 2/1999 | Flasher | |
| 6,184,161 B1 * | 2/2001 | Verpoest ................. | B29C 70/24 |
| | | | 427/322 |
| 7,690,225 B2 | 4/2010 | Relats et al. | |
| 10,208,410 B2 | 2/2019 | Gao et al. | |
| 10,590,574 B2 | 3/2020 | Kaing et al. | |
| 11,268,217 B2 * | 3/2022 | Woodruff .............. | D03D 15/47 |
| 11,686,022 B2 | 6/2023 | Yoneshige et al. | |
| 2018/0027770 A1 * | 2/2018 | Mikelson ................ | D02G 3/38 |
| 2018/0358541 A1 * | 12/2018 | Tajitsu ................. | H10N 30/857 |
| 2019/0273199 A1 * | 9/2019 | Tajitsu ..................... | D04B 1/16 |

FOREIGN PATENT DOCUMENTS

| | | |
|---|---|---|
| EP | 0512994 A1 | 11/1992 |
| EP | 3133328 A1 | 2/2017 |
| JP | 2009252605 A | 10/2009 |

* cited by examiner

*Primary Examiner* — Shaun R Hurley
(74) *Attorney, Agent, or Firm* — John D. Wright; Dickinson Wright PLLC

(57) ABSTRACT

A protective textile sleeve includes a braided, tubular wall extending lengthwise along a central longitudinal axis between opposite ends. The wall includes hybrid yarns, with each of the hybrid yarns including at least one multifilament wrapped about a monofilament, such that the monofilament is concealed by the at least one multifilament.

13 Claims, 2 Drawing Sheets

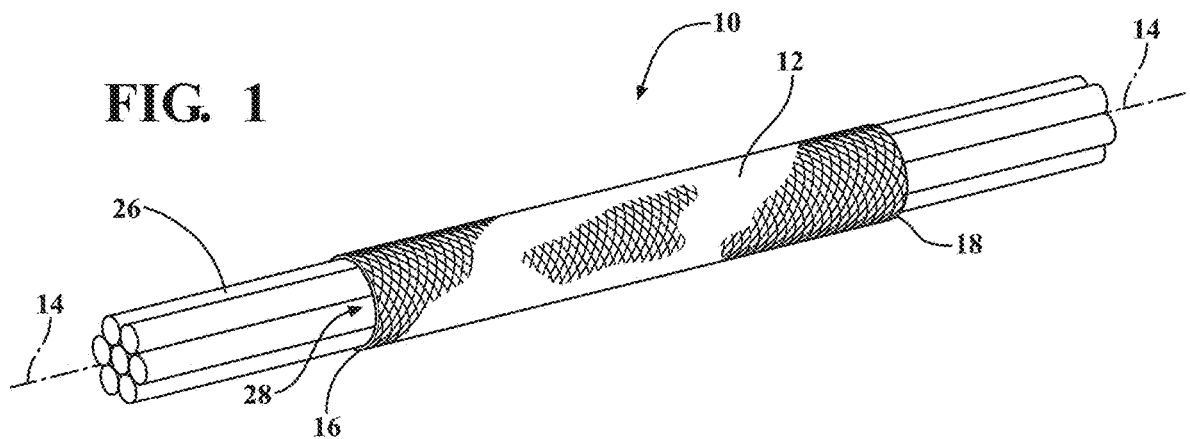
FIG. 1
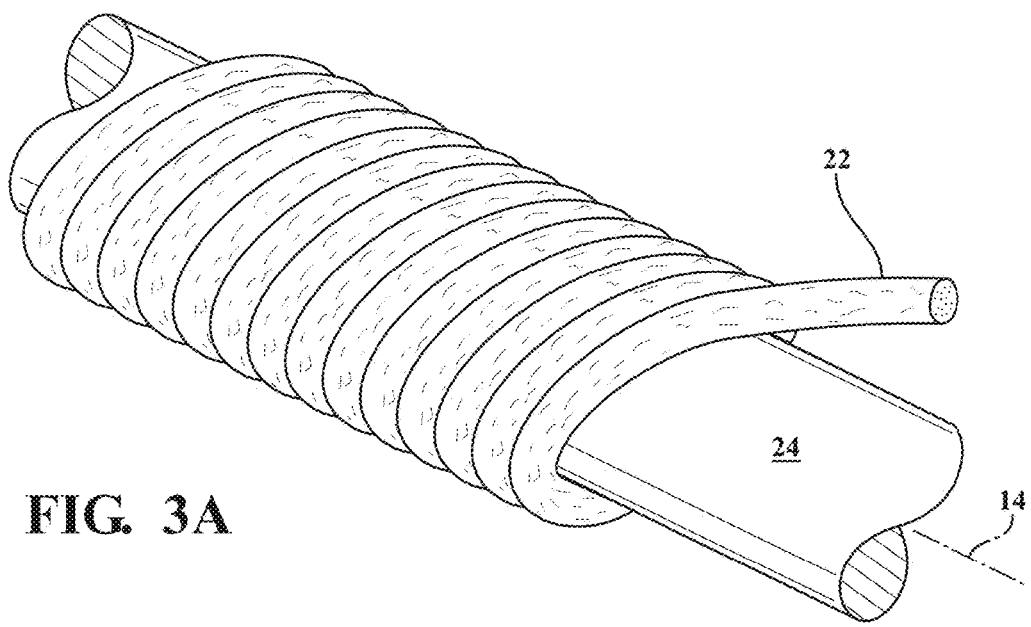
FIG. 2
FIG. 3A

BRAIDED TUBULAR TEXTILE SLEEVE WITH HYBRID YARNS AND METHOD OF CONSTRUCTION THEREOF

CROSS-REFERENCE TO RELATED APPLICATION

This application claims the benefit of U.S. Provisional Application Ser. No. 63/524,514, filed Jun. 30, 2023, which is incorporated herein by reference in its entirety.

BACKGROUND OF THE INVENTION

1. Technical Field

This invention relates generally to textile sleeves, and more particularly to braided textile sleeves.

2. Related Art

It is known to protect elongate members in textile sleeves against a variety of environmental conditions and affects, or to just contain elongate members in textile sleeves for bundling and routing purposes, such as in braided sleeves. In the case of braided sleeves, the braided wall is commonly braided using monofilaments, multifilaments, or both, in separately braided relation with one another. One known advantage of a closed, braided wall construction is that the wall can be circumferentially expanded to facilitate sliding the wall over an elongated member by manually pushing and physically holding the opposite ends of the wall in a compressed fashion. By pushing the opposite ends toward one another and manually holding the wall in an axially compressed state, the braided wall is caused to take on an increased diameter state and a reduced length. Monofilaments facilitate desired radial expansion of the braided wall during assembly of the wall about an elongate member when axially compressed, due to their being relatively along their length (axially stiff) as compared to more axially flimsy and compressible multifilament yarns. When in the increased diameter state, the wall can be readily disposed over the elongate member, such as a wire harness. Then, after sleeve is installed over the elongate member, the installer can release the wall and pull the opposite ends away from one another, thereby allowing the wall to take on a decreased diameter and increased length into close, conforming fit about the elongate member. Although monofilaments can facilitate assembly, they generally have a smooth, shiny appearance, and in some applications, this is undesirable. Further yet, monofilaments, being solid and generally stiff, generally do not dampen vibration and suppress noise as well as multifilaments, nor are they generally as insulative thermally as multifilaments. Accordingly, it is known to facilitate vibration and noise reduction by braiding multifilaments in separate, side-by-side, parallel relation with monofilaments. However, the shininess of the monofilaments is still present, and some reduction of desired radial expansion during axial compression of the wall results, due to the space occupied between the monofilaments by the relatively limp multifilaments, thereby making assembly of the sleeve about the elongate member more difficult.

A braided sleeve in accordance with the disclosure herein addresses at least the drawbacks discussed above, as well as others that will be appreciated by a person possessing ordinary skill in the art of protective textile sleeves.

SUMMARY OF THE INVENTION

In accordance with one aspect of the invention, a protective textile sleeve includes a braided, tubular wall extending lengthwise along a central longitudinal axis between opposite ends. The wall includes hybrid yarns, with each of the hybrid yarns including at least one multifilament served about a monofilament, such that the monofilament is substantially concealed by the at least one multifilament.

In accordance with another aspect of the invention, the multifilaments are served about the monofilament in the same helical direction, either an S or opposite Z helical direction.

In accordance with another aspect of the invention, the at least one multifilament includes a pair of multifilaments served in opposite helical directions about the monofilament, thereby form a force-balanced yarn.

In accordance with another aspect of the invention, the monofilaments are thermoplastic.

In accordance with another aspect of the invention, the monofilaments are polyester.

In accordance with another aspect of the invention, the monofilaments have a diameter between about 0.1-0.4 mm.

In accordance with another aspect of the invention, the monofilaments are heat-set.

In accordance with another aspect of the invention, the multifilaments are textured.

In accordance with another aspect of the invention, the multifilaments have a denier between about 200 and 600.

In accordance with another aspect of the invention, the multifilaments are served between about 800-1200 turns/meter.

In accordance with another aspect of the invention, the wall is braided entirely with the hybrid yarns.

In accordance with another aspect of the invention, a textile sleeve for protecting an elongate member, consists of: a tubular wall formed of a plurality of yarns braided with one another. The tubular wall bounds a cavity sized for receipt of the elongate member therein, with the cavity extending lengthwise along a central longitudinal axis between opposite ends of the tubular wall. At least some of the plurality of yarns include hybrid yarns. Each of the hybrid yarns include at least one multifilament wrapped about a monofilament, wherein an outer surface of the monofilament is substantially concealed by the at least one multifilament.

In accordance with another aspect of the invention, a method of constructing a braided sleeve includes braiding a plurality of yarns with one another to form a seamless tubular wall extending lengthwise along a central longitudinal axis with at least some of the yarns being provided as hybrid yarns. Further, providing the hybrid yarns including a monofilament and at least one multifilament, with the at least one multifilament being served about the monofilament and concealing the monofilament.

In accordance with another aspect, the method can further include wrapping each of the at least one multifilament about the monofilament in the same helical direction.

In accordance with another aspect, the method can further include wrapping a pair of multifilaments in opposite helical directions about the monofilament.

In accordance with another aspect, the method can further include wrapping the at least one multifilament between about 800-1200 turns/meter about the monofilament.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a schematic perspective view of a tubular braided sleeve constructed in accordance with one embodiment of the invention shown disposed about an elongate member to be protected;

FIG. 2 is an enlarged fragmentary view of a wall of the sleeve of FIG. 1;

FIG. 3A is a fragmentary perspective view of a hybrid yarn used to braid a sleeve in accordance with one aspect of the disclosure;

DETAILED DESCRIPTION OF PRESENTLY PREFERRED EMBODIMENTS

Figure 3B:
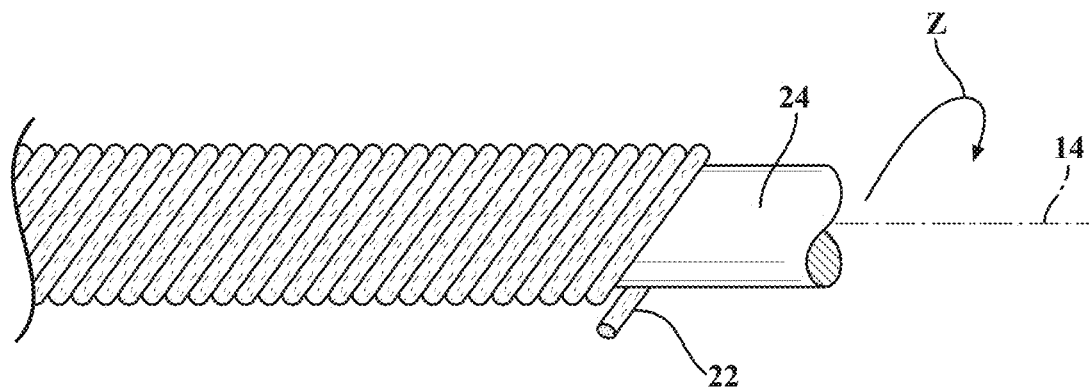
FIG. 3B is a fragmentary side elevation view of the hybrid yarn of FIG. 3A.
Figure 4:
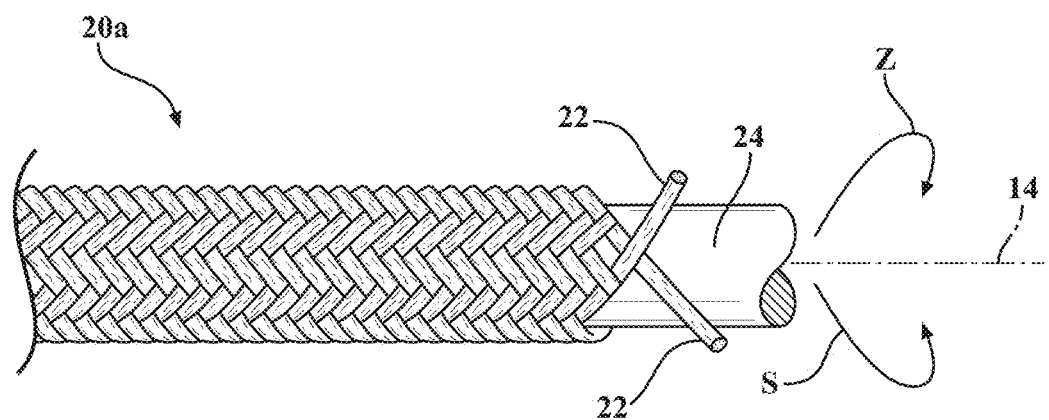
FIG. 4 is a view similar to FIG. 3A of a hybrid yarn used to braid a sleeve in accordance with another aspect of the disclosure.

Referring in more detail to the drawings, FIGS. 1 and 2 illustrate a braided protective textile sleeve, referred to hereafter as sleeve 10, constructed in accordance with one aspect of the invention. The sleeve 10 has a braided, circumferentially continuous, seamless tubular wall 12 extending lengthwise along a central longitudinal axis 14 between opposite ends 16, 18. The wall 12 includes hybrid yarns 20, 20a (FIGS. 3A-3B and 4, respectively). The wall 12 can be braided entirely with the hybrid yarns 20, 20a, or can include the hybrid yarns 20, 20a braided with separate, also referred to as individual multifilaments, if desired. Each of the hybrid yarns 20, 20a includes at least one multifilament 22 and a centrally located monofilament 24, with the at least one multifilament 22 being served (also referred to as wrapped or cabling) about the monofilament 24. The term "served" is well understood by a person possessing ordinary skill in the textile arts (POSA) to mean one yarn extends generally straight, and in this case the monofilament 24, while the other yarn, and in this case the multifilament(s) 22, is helically wrapped about the monofilament 24. The monofilament 24 is substantially, and optimally entirely concealed by the at least one served multifilament 22. Substantially is intended to mean that a naked eye can see a very small portion of the underlying monofilament 24, but the vast majority of the underlying monofilament 24, such as between about 97-100% of the outer surface area of the underlying monofilament is covered by the outer multifilament 24.

The multifilaments 22 absorb light, rendering the multifilaments 22 substantially non-reflective and dull in finish and appearance (lacking shine, also referred to as sheen). The monofilaments 24 provide the hybrid yarn 20, 20a with the axial stiffness needed and desired to facilitate causing the sleeve 10 to expand radially when axially compressed along the central longitudinal axis 14, thereby making assembly of the sleeve 10 over an elongate member 26, such as a wire harness, by way of example and without limitation, easier by enlarging a central cavity 28 bounded by the wall 12. The multifilaments 22 render an outer surface 30 of the sleeve 10 dull in appearance, such as having a non-reflective matte finish, as discussed above. Further, the multifilaments 22 act to dampen vibration and noise, given their relative soft texture, as well as enhance thermal insulative properties, thereby enhancing the multifaceted protective properties of the sleeve 10 to the elongate member(s) 26 contained in the cavity 28. Accordingly, the hybrid yarn 20, 20a provides synergies to enhance the functionality of the wall 12, including both in assembly and during use.

The at least one multifilament 22 served about the monofilament 24, in accordance with one aspect of the disclosure, is provided as a single multifilament served in a single helical direction, shown as a Z helical direction (FIGS. 3A-3B), by way of example and without limitation. It is to be understood that the multifilament 22 could be provided as a single multifilament served in a single S helical direction, corresponding to a helical direction opposite the Z helical direction, as will by understood by a POSA.

The at least one multifilament 22 served about the monofilament 24, in accordance with another aspect of the disclosure, can be provided as a plurality of multifilaments, such as a pair of multifilaments, by way of example and without limitation, with each served in opposite S and Z helical directions (FIG. 4) from one another, by way of example and without limitation. The multiple multifilaments 22 can be served concurrently with one another in braided fashion, or separately from one another, with one multifilament 22 being served or braided in one of the S or Z direction about the underlying monofilament 24, and the next multifilament 22 being served or braided in the opposite S or Z direction about the underlying multifilament 22.

The monofilaments 24 can be provided as a thermoplastic, such as polyester, polypropylene, or polyethylene, by way of example and without limitation. The monofilaments 24 have a diameter between about 0.1-0.4 mm. The monofilaments 24 are provided as a heat-settable material, and upon completing construction of the sleeve 10, the monofilaments 24 are heat-set to facilitate maintaining the wall 12 in a tubular form.

The multifilaments 22 have a denier between about 200 and 600. The multifilaments 22 are served between about 800-1200 turns/meter about the monofilament 22, and are provided from any multifilament material having a dull, matte finish. In accordance with one aspect, the multifilaments 22 can be provided from a mineral fiber (also referred to as mineral yarn), e.g. basalt, silica, or ceramic or fiberglass, by way of example and without limitation, cotton, or any other multifilament having the dull appearance and vibration/noise dampening, thermally insulative properties desired. The multifilaments 22 can be textured (roughened) to further enhance the dull, matte finish and dampening properties. Regardless of the number of turns/meter, the multifilaments 22 are wrapped (served) to preferably completely conceal the central, underlying monofilaments 24 from being viewable, such as to an observer with a naked eye, and in accordance with one aspect, the multifilaments 22 are wrapped between about 800-1200 turns/meter. The number of needed turns/meter will be dependent on the diameter of the monofilament 24 and the denier of the multifilament(s) 22, as will be understood by a POSA.

A method of construction of constructing a braided sleeve 10 in accordance with another aspect of the disclosure includes braiding a plurality of yarns with one another to form a seamless tubular wall 12 extending lengthwise along a central longitudinal axis 14 with at least some of the yarns being provided as hybrid yarns 20, 20a. The hybrid yarns 20, 20a including a monofilament 24 and at least one multifilament 22. The at least one multifilament 22 being served (wrapped) about the monofilament 24 and substantially or preferably entirely concealing the monofilament 24 from being viewable, such as by a observed looking directly at the hybrid yarn 20, 20a from close-up, such as from as little as 1-3 feet distance.

In accordance with another aspect, the method can further include wrapping each of the at least one multifilament 22 about the monofilament 24 in the same helical direction.

In accordance with another aspect, the method can further include wrapping a pair of multifilaments 22 in opposite helical directions about the monofilament 24.

In accordance with another aspect, the method can further include wrapping the at least one multifilament 22 between about 800-1200 turns/meter about the monofilament 24.

Many modifications and variations of the present invention are possible in light of the above teachings. In addition, it is to be recognized that a braided tubular wall constructed in accordance with the various aspects of the invention can take on a multitude of uses, including that of a protective member, a bundling member, or even a novelty item, by way of example and without limitation. It is, therefore, to be understood that the invention may be practiced otherwise than as specifically described, and that the scope of the invention is defined by any ultimately allowed claims.

What is claimed is:

1. A protective textile sleeve, comprising:
   a tubular wall formed of yarns braided with one another, said tubular wall extending lengthwise along a central longitudinal axis between opposite ends; and
   at least some of said yarns including hybrid yarns, each of said hybrid yarns including at least one multifilament wrapped about a monofilament, wherein the monofilament is substantially concealed by the at least one multifilament,
   wherein the monofilaments have a diameter between about 0.1-0.4 mm.

2. The protective sleeve of claim 1, wherein the at least one multifilament is wrapped about the monofilament in a single helical direction.

3. The protective sleeve of claim 1, wherein the monofilaments are thermoplastic.

4. The protective sleeve of claim 3, wherein the monofilaments are polyester.

5. The protective sleeve of claim 1, wherein the multifilaments are textured.

6. The protective sleeve of claim 1, wherein the wall is braided entirely with the hybrid yarns.

7. A protective textile sleeve, comprising:
   a tubular wall formed of yarns braided with one another, said tubular wall extending lengthwise along a central longitudinal axis between opposite ends; and
   at least some of said yarns including hybrid yarns, each of said hybrid yarns including at least one multifilament wrapped about a monofilament, wherein the monofilament is substantially concealed by the at least one multifilament,
   wherein the at least one multifilament includes a pair of multifilaments wrapped in opposite helical directions about the monofilament.

8. A protective textile sleeve, comprising:
   a tubular wall formed of yarns braided with one another, said tubular wall extending lengthwise along a central longitudinal axis between opposite ends; and
   at least some of said yarns including hybrid yarns, each of said hybrid yarns including at least one multifilament wrapped about a monofilament, wherein the monofilament is a thermoplastic substantially concealed by the at least one multifilament,
   wherein the monofilaments are heat-set.

9. A protective textile sleeve, comprising:
   a tubular wall formed of yarns braided with one another, said tubular wall extending lengthwise along a central longitudinal axis between opposite ends; and
   at least some of said yarns including hybrid yarns, each of said hybrid yarns including at least one multifilament wrapped about a monofilament, wherein the monofilament is substantially concealed by the at least one multifilament,
   wherein the multifilaments have a denier between about 200 and 600.

10. A protective textile sleeve, comprising:
    a tubular wall formed of yarns braided with one another, said tubular wall extending lengthwise along a central longitudinal axis between opposite ends;
    at least some of said yarns including hybrid yarns, each of said hybrid yarns including at least one multifilament wrapped about a monofilament, wherein the monofilament is substantially concealed by the at least one multifilament,
    wherein the multifilaments are wrapped between about 800-1200 turns/meter.

11. A textile sleeve for protecting an elongate member, consisting of:
    a tubular wall formed of a plurality of yarns braided with one another, said tubular wall bounding a cavity sized for receipt of the elongate member therein, said cavity extending lengthwise along a central longitudinal axis between opposite ends of said tubular wall; and
    at least some of said plurality of yarns including hybrid yarns, each of said hybrid yarns including at least one multifilament wrapped about a monofilament, wherein an outer surface of said monofilament is substantially concealed by said at least one multifilament,
    wherein said plurality of yarns include said hybrid yarns and individual multifilaments.

12. The textile sleeve of claim 11, wherein said hybrid yarns include a plurality of multifilaments wrapped about said monofilament.

13. The textile sleeve of claim 11, wherein said hybrid yarns include a single multifilament wrapped about said monofilament.

* * * * *